Figure 1:
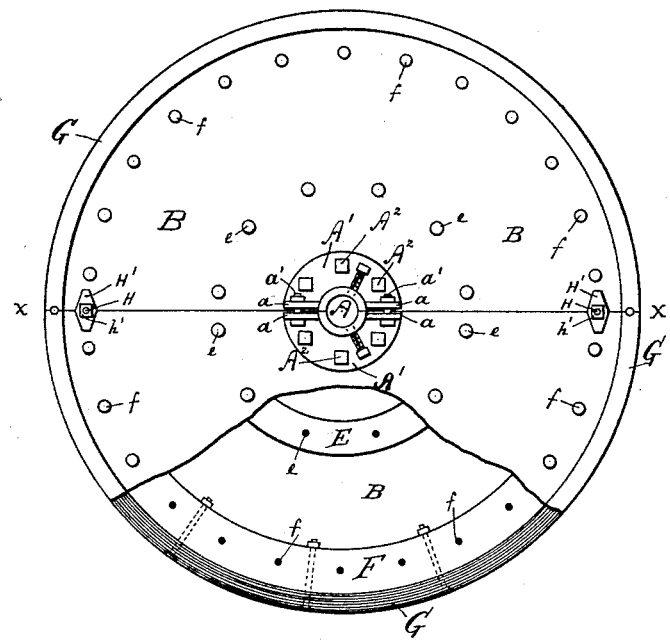

(No Model.)

J. LATHROP & A. TYRRELL.
PULLEY OR WHEEL.

No. 325,251. Patented Sept. 1, 1885.

Witnesses:
L. Holmboe
C. C. Linthicum

Inventors
Joseph Lathrop
and Alvin Tyrrell
by Bruce Fisher
his Attorneys

UNITED STATES PATENT OFFICE.

JOSEPH LATHROP AND AHIRA TYRRELL, OF CHICAGO, ILLINOIS.

PULLEY OR WHEEL.

SPECIFICATION forming part of Letters Patent No. 325,251, dated September 1, 1885.

Application filed March 3, 1885. (No model.)

*To all whom it may concern:*

Be it known that we, JOSEPH LATHROP and AHIRA TYRRELL, citizens of the United States, residing at Chicago, in the county of Cook and State of Illinois, have invented certain new and useful Improvements in Pulleys and other Wheels, of which we do declare the following to be a full, clear, and exact description, reference being had to the accompanying drawings, forming part of this specification.

Our present invention relates particularly to that class of pulleys or wheels wherein thin veneers of wood suitably cemented together are employed to form the portions of the pulleys intermediate the hub and rim; and the object of our invention is primarily to so construct the veneer body of a pulley or wheel that it will with greater certainty resist strain, and will be less liable to become warped or loosened than pulleys made in accordance with present known constructions.

A further object of invention is to provide improved means for securely locking together the halves of a split or separable pulley.

To this end our invention consists in forming the body of a pulley or other wheel of separate disks made of multiple wood veneers glued together with their grains crossed, said disks being connected at a point intermediate the hub and rim, and from such point being flared outwardly to the rim and, preferably, also to the hub.

Our invention also consists in forming the body of a pulley of disks of multiple wood veneers glued together and provided with brace-strips between said disks intermediate the hub and the rim.

Our invention further consists in providing the body of the pulley or wheel with brace-strips placed between the veneer disks at a point at or near the rim, which shall serve not only to strengthen the body, but also as a means for uniting the rim thereto.

Our invention further consists in providing the half-sections of a split pulley with half-rings, the ends of which shall project in such manner as to aid in locking the sections of the pulley together.

Our invention also consists in the combination, with the divided sections of a split pulley, of clamping-bolts having tie-plates extending across the joint of the pulley-sections, said tie-plates being provided with downwardly-bent ends, which enter suitable seats or depressions in the body of the pulley.

Our invention consists, finally, in forming the metallic hubs of the pulleys with clamping-flanges having projections or ribs thereon adapted to bite into the surface of the wooden disks, and thus aid in securely holding the same in place.

It will be readily understood that certain features of our invention, although illustrated as applied to a pulley, are applicable as well to the manufacture of wheels of various kinds—such as car-wheels, truck-wheels, and the like—and the word "pulley," where used in the description and claims, is not therefore to be regarded as a term of limitation. So, also, it will be apparent that although the invention is shown as embodied in a split pulley, it is equally applicable to simple or unsplit pulleys, and for such reason the term "disk," as hereinafter employed, is designed to include the veneer disks whether the same be divided, as shown, or formed each in a single piece.

Figure 2:
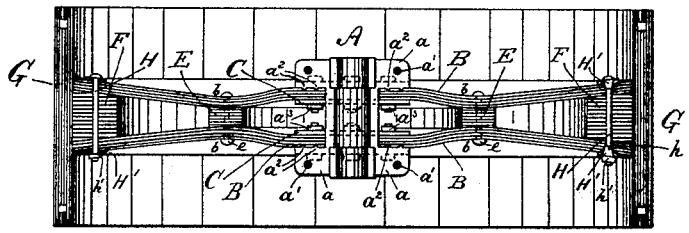
Figure 3:
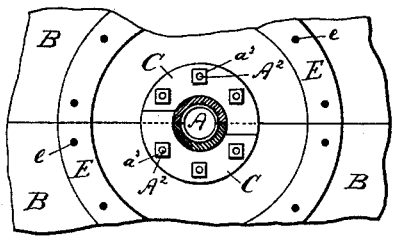
Figure 4:
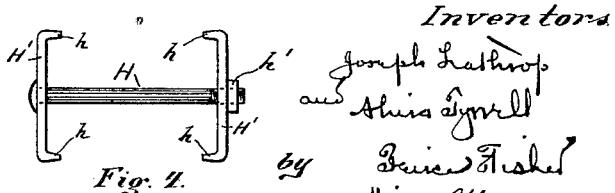

Figure 1 is a view in side elevation of a pulley embodying our invention, a portion being broken away for illustration of subjacent parts. Fig. 2 is a view in central section on line $x\,x$ of Fig. 1. Fig. 3 is a fractional view in vertical transverse section through the center of the hub. Fig. 4 is a detail view of a tie-bolt and plates for uniting the sections of the pulley.

A designates the cast-metal hub of the pulley, which for split pulleys will be formed, as shown, of semi-cylindrical sections, having lugs or flanges $a$ to receive the bolts $a'$, by which the sections of the hub will be firmly held together. Upon the periphery of each section of the hub are formed the flanges A', provided with suitable V-shaped projections or ribs, $a^2$, on their inner faces, to bite into the veneer disks and more securely guard the same against becoming loose. In the flanges A' suitable holes are formed to admit the bolts A², which pass through the disks B and the clamping half-rings C, and are provided at their threaded ends with nuts $a^3$. From this construction it will be seen that when the disks are fitted in place between the flanges A' and rings C, the tightening of the bolts A² will serve to firmly clamp the disks to the flanges, at the same time causing the projections $a^2$ to so enter the surface of the wood as to aid in firmly guarding the disks against any movement on the hub.

The disks B are constructed of thin laminæ or veneers of wood glued together with their grains crossed, and between the center and periphery of each disk an annular depression, $b$, is formed, from which depression the disk is flared outwardly toward its periphery and, preferably, also toward its center. Between the disks B, at a point opposite the depression $b$, will be placed the bracing strip or strips E, which we prefer to form of veneers glued together with their grains crossed, and to these strips the disks will be firmly held by means of the bolts or rivets $e$. At or near the periphery of the disks the bracing-strips F will be placed, and to these strips the disks will be securely bolted by means of the bolts or rivets $f$. The rim G of the pulley is formed, preferably, of wood veneers glued together and molded to the proper shape, and this rim is connected to the body of the pulley by glue, and also by bolts, which pass through the rim and through the bracing-strips F. The two sections of the split pulley, when placed in position upon the shaft, are held together not only by the bolts $a'$, which pass through the sections of the hubs, but as well also by means of the tie-bolts H and tie-plates H', the bolts H passing through suitable openings at the joint of the sections, and the bent ends $h$ of the tie-plates fitting into suitable seats formed in the surface of each of the sections. The ends of the bolts H will be threaded and provided with clamp-nuts $h'$, by which the tie-plates will be securely held in their proper position.

From the foregoing construction it will be seen that by forming the disks in the manner shown a broad bearing is obtained between the body and the rim, and the disks brace each other, and thus more effectively resist the strain to which they will be subjected.

It will be seen that the bracing-strips F not only serve to strengthen the wooden disks, but also afford a means whereby the rim may be securely attached to the body of the pulley. The bracing-strips F serve also to give increased strength to the body as well as to hold the disks at suitable distances apart.

It is preferred to flare the disks outwardly toward the hub in the manner shown, as a broader and more secure bearing is thereby obtained; but in some cases, particularly where the pulley is of small diameter, this feature may be omitted, and the disks may be straight from the point of the depression $b$. So, also, the bracing-strips F may be omitted without departing from the scope of our invention, the disks in such case being flared considerably toward both the rim and the hub. The construction shown is, however, regarded as the preferable one.

Having thus described our invention, what we claim as new, and desire to secure by Letters Patent, is—

1. A pulley comprising a metallic hub, a rim, and a body consisting, essentially, of separate disks formed of multiple wood veneers glued together with their grains crossed, said disks extending each from the hub to the rim, and being connected at a point between the rim and the hub, and from such point being flared outwardly, substantially as described.

2. A pulley comprising a metallic hub, a rim, and a body consisting, essentially, of two separate disks formed of multiple wood veneers glued together with their grains crossed, said disks being connected at a point between the rim and the hub, and from such point being flared outwardly to both the hub and the rim, substantially as described.

3. A disk for forming the body of a pulley or wheel, having a central opening to receive the wheel-hub, and having an annular depression, substantially as shown, between its center and periphery, substantially as described.

4. A pulley comprising a metallic hub, a rim, a body consisting of disks of multiple wood veneers glued together, and brace-strips E between said disks, intermediate the hub and rim, substantially as described.

5. A pulley comprising a hub, a rim, and a body consisting of two disks of multiple veneers glued together and having bracing-strips F at the rim, substantially as described.

6. The combination, with a split pulley comprising a metallic flanged hub, a rim, and a body formed of separate divided disks, of the half-rings C, having projecting ends for locking the sections of the pulley, substantially as described.

7. In a split pulley, the combination, with the two main sections, of the bolts H and the tie-plates H', extending across the joint of the pulley-sections, substantially as described.

8. In a pulley, the combination, with the wood-veneer disks, of the metallic hub having flanges A', with projections $a^2$ on the inner faces thereof, substantially as described.

JOSEPH LATHROP,
AHIRA TYRRELL.

Witnesses.
JAMES H. PEIRCE,
L. HOLMBOE.